US012609929B2

(12) United States Patent
Mercier et al.

(10) Patent No.: US 12,609,929 B2
(45) Date of Patent: *Apr. 21, 2026

(54) SECURITY-ENHANCED AUTO-CONFIGURATION OF NETWORK COMMUNICATION PORTS FOR CLOUD-MANAGED DEVICES

(71) Applicant: Hewlett Packard Enterprise Development LP, Spring, TX (US)

(72) Inventors: Mathieu Mercier, St. Laurent (CA); Robert Gagnon, St. Laurent (CA); Frederic Mouveaux, St. Laurent (CA); Guy Letourneau, St. Laurent (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 334 days.

This patent is subject to a terminal disclaimer.

(21) Appl. No.: 18/360,375

(22) Filed: Jul. 27, 2023

(65) Prior Publication Data

US 2023/0370458 A1 Nov. 16, 2023

Related U.S. Application Data

(63) Continuation of application No. 17/205,684, filed on Mar. 18, 2021, now Pat. No. 11,757,876.

(51) Int. Cl.
*H04L 9/40* (2022.01)
*H04L 41/0806* (2022.01)
*H04L 41/0813* (2022.01)

(52) U.S. Cl.
CPC ...... *H04L 63/0876* (2013.01); *H04L 41/0806* (2013.01); *H04L 41/0813* (2013.01)

(58) Field of Classification Search
None
See application file for complete search history.

(56) References Cited

U.S. PATENT DOCUMENTS 6,230,194 B1 * 5/2001 Frailong ................. H04L 41/28
709/221
6,453,351 B1 9/2002 Endo
(Continued)

FOREIGN PATENT DOCUMENTS

WO 2007/016324 A1 2/2007

OTHER PUBLICATIONS

Theciscokid, "Automated AP Configuration," Wireless Networking—Spiceworks, Jun. 16, 2017, 13 pgs., website accessed Sep. 25, 2020, https://community.spiceworks.com/topic/2006565-automated-ap-configuration.

*Primary Examiner* — Scott B Christensen
(74) *Attorney, Agent, or Firm* — Trop, Pruner & Hu, P.C.

(57) ABSTRACT

Systems, methods, and computer-readable media are described for auto-configuring a network communication port such as an Ethernet port to which a network device is connected in a manner that eliminates or otherwise dramatically mitigates the manual effort required for port configuration, while at the same time, ensuring that network security is maintained by authenticating the device during the auto-configuration process. Various auto-configuration processes are described that include varying levels of verification processing to ensure that the network device connected to the port to be configured is a device that is authorized to connect to the network. In this manner, the threat of device spoofing is eliminated or otherwise substantially reduced. Auto-configuration of network ports in connection with switching a known network device to a new port or connecting a previously unknown network device to a network port are described.

20 Claims, 11 Drawing Sheets

(56) References Cited

U.S. PATENT DOCUMENTS

| | | | |
|---|---|---|---|
| 7,380,025 B1 | 5/2008 | Riggins et al. | |
| 7,843,923 B2 | 11/2010 | Baum | |
| 7,965,842 B2 | 6/2011 | Whelan et al. | |
| 8,060,592 B1 | 11/2011 | Watsen et al. | |
| 8,966,018 B2 | 2/2015 | Bugwadia et al. | |
| 9,401,889 B2 | 7/2016 | Andrews | |
| 9,661,112 B2 | 5/2017 | Chao et al. | |
| 9,979,693 B2 | 5/2018 | Chiang | |
| 10,270,658 B2 | 4/2019 | Sharma et al. | |
| 10,554,483 B2 | 2/2020 | Nagarajan et al. | |
| 10,616,220 B2 | 4/2020 | Arora et al. | |
| 11,223,871 B2 | 1/2022 | Satheesh et al. | |
| 2007/0268506 A1* | 11/2007 | Zeldin | H04L 41/0806 358/1.13 |
| 2007/0268515 A1 | 11/2007 | Freund et al. | |
| 2007/0268516 A1* | 11/2007 | Bugwadia | H04L 41/0886 358/1.15 |
| 2008/0189769 A1 | 8/2008 | Casado et al. | |
| 2010/0180016 A1 | 7/2010 | Bugwadia et al. | |
| 2013/0091534 A1 | 4/2013 | Gilde et al. | |
| 2018/0013798 A1 | 1/2018 | Pallas | |
| 2018/0270109 A1 | 9/2018 | Hollis | |
| 2019/0089592 A1 | 3/2019 | Li et al. | |
| 2019/0238539 A1 | 8/2019 | Arora et al. | |
| 2019/0349366 A1* | 11/2019 | Dewan | H04L 41/0806 |
| 2020/0137055 A1 | 4/2020 | Isola et al. | |
| 2020/0186427 A1* | 6/2020 | Chunduru Venkata | H04L 9/3268 |
| 2020/0280568 A1 | 9/2020 | Bratspiess et al. | |
| 2021/0112034 A1* | 4/2021 | Sundararajan | H04L 47/125 |
| 2021/0243034 A1 | 8/2021 | Walrant | |

* cited by examiner

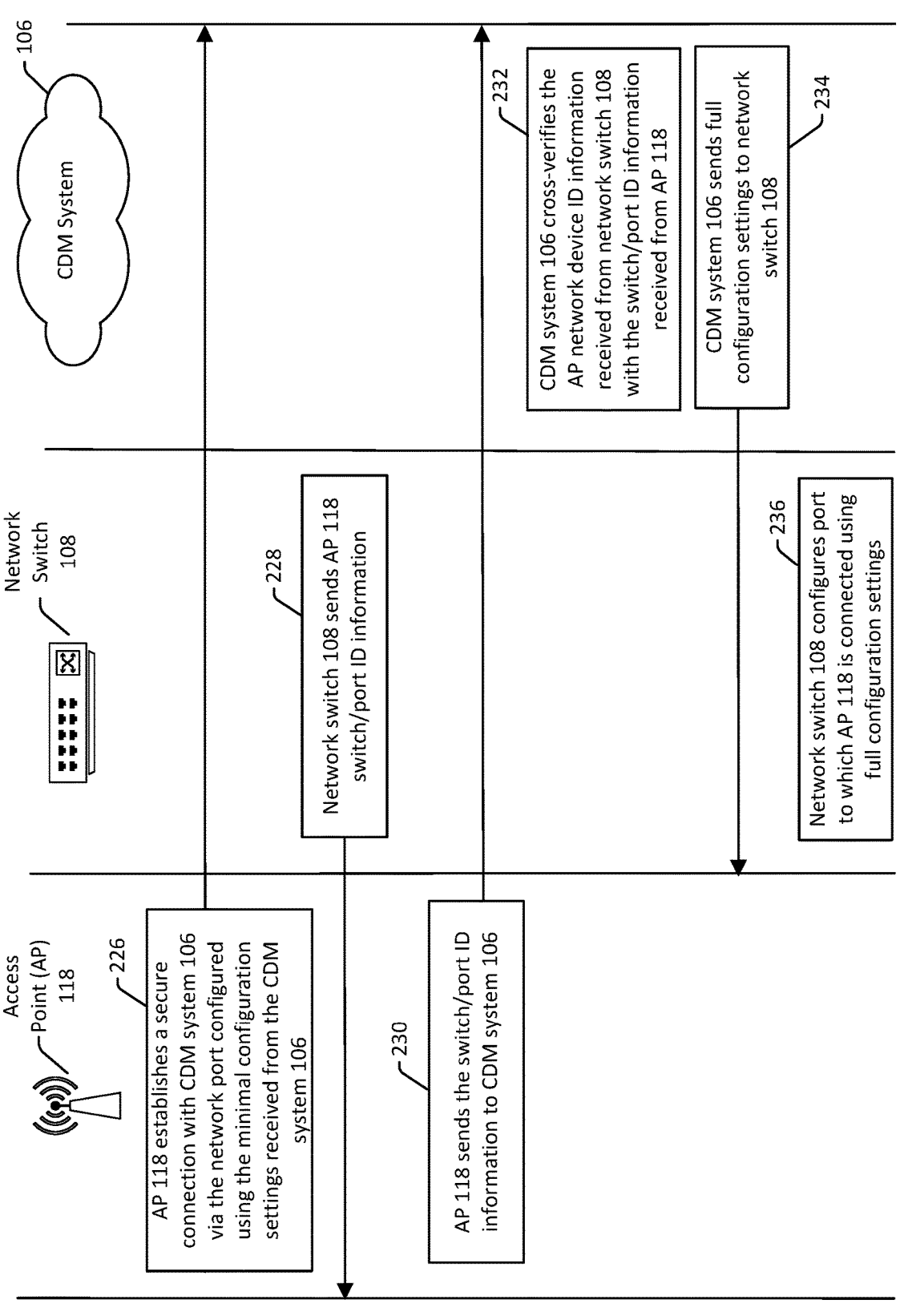

CDM System 106

Network Switch 108

Access Point (AP) 118

226

AP 118 establishes a secure connection with CDM system 106 via the network port configured using the minimal configuration settings received from the CDM system 106

228

Network switch 108 sends AP 118 switch/port ID information

230

AP 118 sends the switch/port ID information to CDM system 106

232

CDM system 106 cross-verifies the AP network device ID information received from network switch 108 with the switch/port ID information received from AP 118

234

CDM system 106 sends full configuration settings to network switch 108

236

Network switch 108 configures port to which AP 118 is connected using full configuration settings

FIG. 2C

SECURITY-ENHANCED AUTO-CONFIGURATION OF NETWORK COMMUNICATION PORTS FOR CLOUD-MANAGED DEVICES

CROSS-REFERENCE TO RELATED APPLICATIONS

This application is a continuation application of and claims priority to application Ser. No. 17/205,684, filed on Mar. 18, 2021, the contents of which are hereby incorporated by reference in their entireties.

BACKGROUND

When a device is connected to a network communication port that provides access to a network, the port is configured to enable the device to fully realize the capabilities of the network. For instance, when two network devices are connected via respective Ethernet ports, correct configuration of the ports ensures that the devices function as expected. A number of different configuration items relating to, for example, traffic flow through the ports, network access through the ports, port functionality (e.g., power-over-Ethernet (PoE)), and the like may be addressed as part of configuring a network port.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIGS. 2B and 2C are flowcharts illustrating auto-configuration of a network communication port using stepped verification processing according to example embodiments of the disclosed technology.

Figure 1A:
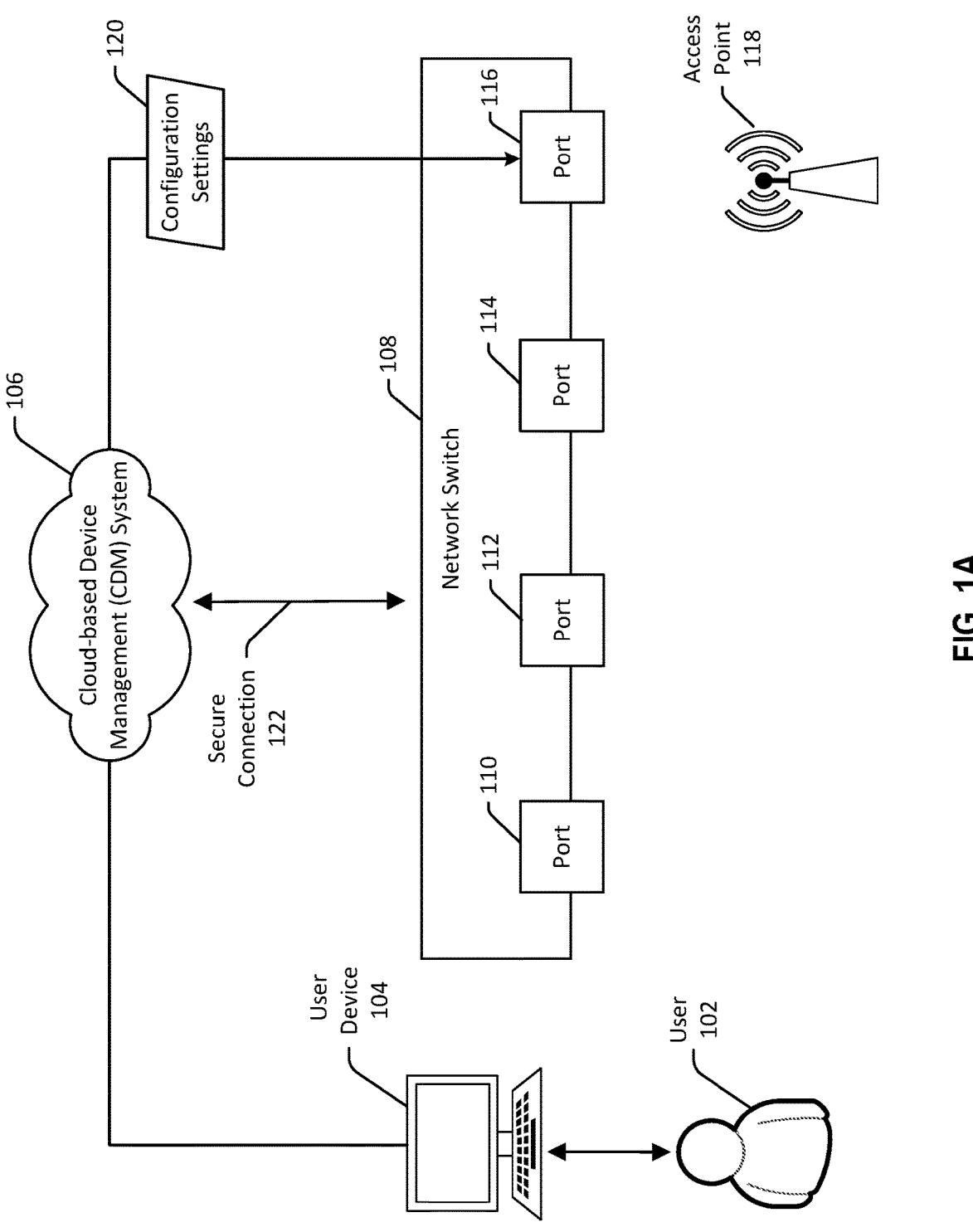
FIG. 1A is a schematic diagram illustrating the addition and authorization of a new unknown network device connected to a network communication port and manual configuration of the port.

The figures are not exhaustive and do not limit the present disclosure to the precise form disclosed.

DETAILED DESCRIPTION

When a device is connected to a network communication port such as, for example, in the case of two network devices connected via respective Ethernet ports, where one device has an established secure connection to a cloud-based management system, certain configuration settings can be applied to the ports to ensure the devices behave as desired. If the proper configuration is not applied to the ports, data integrity and security, among other things, may be compromised. For instance, if the ports are not properly configured, a range of problems could ensue including data traffic not passing through the ports, vulnerability of the network to malicious attacks via an improperly configured port, and so forth.

Because the configuration settings associated with a network port can be extensive, configuring a network port to which a new network device has been connected or to which an existing network device has been switched can be a tedious and error-prone process. For instance, in the case of switching a network device to a new switch/port, the configuration settings may need to be replicated to the new port/switch so that the reconnected device continues to function properly. In particular, in situations where a network administrator lacks deep information technology (IT) experience, the cumbersome nature of ensuring that configuration settings are properly replicated over to a new port/switch can lead to errors. Described herein are technical solutions that address technical problems associated with configuring network ports.

In particular, example embodiments of the disclosed technology relate to, among other things, systems, methods, computer-readable media, techniques, and methodologies for automatically configuring (auto-configuring) a network communication port (also referred to herein as network port or simply port) in a manner that eliminates or otherwise dramatically mitigates the manual effort that conventional solutions require for port configuration, while at the same time, ensuring that network security is maintained by verifying device authenticity during the auto-configuration process. As such, example embodiments of the disclosed technology provide technical solutions to a number of technical problems associated with conventional network port configuration techniques. In particular, example embodiments of the disclosed technology provide techniques for auto-configuring network ports, where such techniques can include different levels of verification processing to ensure that the network device connected to the port to be configured is a device that is authorized to connect to the network. In this manner, example embodiments of the disclosed technology provide a technical solution that eliminates or substantially reduces the likelihood of the technical problem of device spoofing. This technical solution is achieved by implementing device verification measures that prevent configuration of a network port for a network device when the device is not properly authenticated.

To configure a network port, conventional port configuration techniques typically rely on information (e.g., network device information) that is not inherently secure and which can be spoofed by a malicious actor trying to gain unauthorized access to the network. Certain example embodiments of the disclosed technology solve the technical problem of device spoofing by providing auto-configuration techniques that implement various levels of device verification at a cloud-based device management (CDM) system prior to fully configuring a network port. In particular, such example embodiments implement device verification processes that authenticate a network device by, for example, comparing network device information received by the CDM system from the network device over a secure communication link with 1) network device information separately received by the CDM system from a network switch to which the network device has been connected and/or 2) stored information accessible by the CDM system.

In this manner, the network device is authenticated as an authorized device as part of the process for auto-configuring the network port to which the device is connected, but the port is not fully configured until such authentication occurs, thereby solving the technical problem of device spoofing. More generally, configuring a network port using the auto-configuration process described herein substantially reduces the manual effort needed to configure the port, while at the same time, bolstering network security by ensuring that the process only proceeds with respect to network devices whose authenticity has been verified.

According to example embodiments of the disclosed technology, a first cloud-managed network device such as a network switch may be configured with appropriate configuration settings for establishing a secure communication link with a CDM system. As used herein, the term switch refers to any device capable of offering network connectivity, in particular Ethernet connectivity, to other devices. In example embodiments, a second network device such as an access point may be connected to a particular port of the network switch. For instance, the network switch and the access point may be connected via respective Ethernet ports. An auto-configuration process may then be initiated for the connected port, whereby the CDM system verifies that the access point is an authorized device and sends configuration details to the network switch upon authentication of the connected device. The network switch may then utilize the configuration details to configure the port to enable unfettered network access for the access point.

Example embodiments of the disclosed technology are generally described herein using the example of a network switch as a first network device (an "upstream" device) that is securely connected to a CDM system and the example of an access point as a second network device (a "downstream" device) that is then connected to a port of the switch, which in turn, requires the port to be configured to enable the access point to fully communicate on the network. It should be appreciated, however, that the first network device and the second network device can be any combination of types of devices. For instance, the first network device may be an access point that has an established secure connection to the CDM system. The access point may include an integrated switch. Another access point or a network switch may be connected to a port of the access point (which, as noted, is operating at least partially as a switch), thereby triggering an auto-configuration process for the connected port. In other example embodiments, the first network device may be a dedicated network switch with an established secure connection to the CDM system, and another dedicated switch or an access point that includes an integrated switch may be connected to a port of the first network device, thereby triggering an auto-configuration process for the connected port. Thus, device connections that may trigger an auto-configuration process disclosed herein include, without limitation, switch-to-switch, access point-to-access point, or switch-to-access point connections. Further, other types of network devices may similarly trigger an auto-configuration process disclosed herein when connected to a network communication port including, without limitation, routers, bridges, modems, repeaters, hubs, gateways, or the like.

In some example embodiments, an access point that is newly connected to a port of a network switch may be a known device (e.g., a device previously authorized to a customer site by an administrator). For instance, the access point may be a known device that is moved to a different port on the same network switch or to a port on a different switch altogether. The auto-configuration process for the new port to which the access point is now connected may involve varying levels of device verification processing depending on the particular embodiment. In example embodiments, the access point may send network device identification information such as one or more Link Layer Discovery Protocol (LLDP) frames to the network switch via the port to which it has been connected. The LLDP information may include, among other things, a unique device identifier such as a media access control (MAC) address. The LLDP information may further include an indicator that the access point is a device that is eligible for auto-configuration of the network port.

In some example embodiments, the verification processing performed at the CDM system may include comparing a MAC address contained in received LLDP information to stored MAC addresses to determine whether the network device that has been connected to a new network port is an authorized device. More specifically, when an access point, for example, is connected to a new port of a network switch, the access point may send LLDP information to the switch, which in turn, may send the LLDP information to the CDM system. The CDM system may identify a MAC address contained in the received LLDP information and may compare the MAC address against stored MAC addresses corresponding to network devices that the system knows have been authorized for use at the site. If the received MAC address matches a stored MAC address, the CDM system may send full configuration settings to the network switch, based on which, the switch can configure the network port to enable the access point to communicate across the network as desired.

In some example embodiments, a stepped verification process may be implemented to provide an even greater level of device authentication and security. The stepped verification process may proceed initially as described above with the CDM system verifying that a received MAC address matches a stored MAC address. This may represent a first level of authentication for the access point. If a match is detected, CDM system may provide the network switch with only a minimal set of configuration details. The switch may use the minimal configuration settings to configure the network port to enable the access point to establish a secure communication link/channel with the CDM system. The minimal configuration settings may be insufficient, however, for enabling the access point to engage in network communications (e.g., communicate directly with other network devices) beyond those which may be permitted via the secure communication link with the CDM system.

In example embodiments, the access point may establish the secure communication link with the CDM system using secure credentials that were previously provided to the access point. For instance, a network device may be provided with secure credentials for connecting to the CDM system after an administrator authorizes the device. In example embodiments, upon establishing the secure communication channel with the CDM system, the access point may report, to the CDM system, LLDP information received from the network switch. The LLDP information may identify the switch and the specific port to which the access point is connected. In some example embodiments, the switch/port LLDP information may include a unique switch identifier, a unique network port identifier, a composite identifier that uniquely identifies the switch and port together, or the like. The CDM system may then cross-check and compare the switch/port LLDP information reported by the access point to the access point LLDP information previously reported by the switch to verify that the access point that reported the switch/port LLDP information via its secured communication link is connected to the same network switch port from which the access point LLDP information was previously received. If the two sets of LLDP information match up, the CDM system may authenticate the access point at a second level of authentication that represents a more secure level of authentication than the first authentication level. Upon authenticating the access point at the more secure second authentication level, the CDM system may then send the full configuration settings/details to the switch to enable the switch to configure the network port to which the access point is connected for full service delivery.

It should be appreciated that this second stage of verification processing in the stepped verification process described above provides an extra layer of security. In particular, in some scenarios, it may be possible for a malicious actor to spoof the MAC address of an authorized network device (e.g., an access point), in which case, MAC address verification alone may be insufficient to ensure complete network security. In such example scenarios, the second stage of the stepped verification process may serve as an additional authentication measure that must pass before full configuration of the network port is permitted. That is, by initially providing the network switch with minimal configuration settings that only permit the access point to establish a secure connection link with the CDM system, and subsequently performing an additional verification to ensure that access point LLDP information received from the network switch matches switch/port LLDP information received from the access point via the secure link, the threat of spoofing the MAC address of the access point is neutralized. In particular, even if a malicious actor spoofs the MAC address of the access point and the network switch configures the network port based on the minimal configuration settings to permit a secure connection to be established with the CDM system, the malicious actor would not be able to establish the secure communication link because it would not have access to the necessary secure credentials. As such, the second verification stage would not occur and the network port would not be fully configured, thereby preventing the spoofer from gaining network access. Thus, example embodiments of the disclosed technology provide a technical improvement to network configuration technology in the form of auto-configuration techniques that provide enhanced network security.

Generally speaking, when a new network device that is unknown to the CDM system is connected to a network communication port of a known and securely connected network device, configuration settings are applied to the network port to enable the new network device to establish a secure connection with the CDM system and start offering services on the network. An administrator at the customer site typically applies these configuration settings manually at a user terminal connected to the CDM system. In addition, the administrator notifies the CDM system that the new network device is an authorized device at the customer site. For instance, the administrator provides the CDM system with a unique identifier such as the MAC address of the new network device, which the CDM system may add to a list of MAC addresses representative of authorized devices at the customer site.

In some example embodiments, this typically mostly manual process for onboarding a new network device and configuring the network port to which the new device is connected can be automated as well. That is, in addition to network port auto-configuration techniques for known network devices that are switched from an existing connected network port to a new port, example embodiments of the disclosed technology also relate to network port auto-configuration for new unknown network devices. This auto-configuration process for new unknown network devices may—similar to the other auto-configuration processes disclosed herein—include the use of LLDP information for the new device and/or switch/port LLDP information to detect and authenticate the new device. Moreover, as will be described in more detail later in this disclosure, the auto-configuration process for new unknown devices may further include the exchange of an onboarding token between the CDM system and the new network device to automate the cloud discovery and authorization of the new device. It should be appreciated that the auto-configuration process for a new unknown network device may only be performed for devices recognized, based on device LLDP information (e.g., a system description), as being device models supported by the CDM system. A network port may not be configured or re-configured for a network device that does not send the CDM system LLDP information indicating that it is a device model supported by the CDM system.

Specific example implementations of the disclosed technology will now be described in reference to the Figures. FIG. 1A is a schematic diagram illustrating the addition and authorization of a new network device connected to a network communication port and manual configuration of the port. In the example scenario of FIG. 1A, a network switch 108 has an established secure connection 122 with a cloud-based device management (CDM) system 106. The network switch 108 includes multiple network communication ports 110, 112, 114, 116. The ports 110, 112, 114, 116 may be, for example, wired Ethernet ports. Four network ports are illustratively shown, but the switch 108 may include any number of ports.

In the example scenario of FIG. 1A, an access point 118 is newly connected to a particular port (e.g., port 116) of the switch 108. The access point 118 may be a new device that is unknown to the CDM system 106. For instance, the access point 118 may be a new network device introduced at a customer site at which the network switch 108 has already been deployed. The access point 118 and the network switch 108 may be connected via respective Ethernet ports. While the network switch 108 is illustratively depicted in FIG. 1A as the "upstream" device that has already been deployed and configured and the access point 118 is illustratively depicted as the "downstream" device that is connected to a new port of the switch 108 (thereby requiring configuration of the port to provide the access point 118 with full access to the network and its capabilities), it should be appreciated that numerous other possibilities are contemplated within the scope of the disclosure. For instance, the access point 118 may be the upstream device (e.g., the access point 118 may include an integrated switch) and the network switch 108 or another access point may be the downstream device connected to a new port of the access point 118. As another non-limiting example, the switch 108 may be the upstream device and another dedicated switch may be the downstream device. These other example variations are equally applicable to the example embodiments depicted in the other Figures.

Referring again to FIG. 1A, a user 102 such as a network administrator may initially install the switch 108 at the customer site. Installation of the switch 108 may include the CDM system 106 discovering the switch 108 and receiving an indication from the administrator 102 that the switch 108 is an authorized device for the site. From this point forward, the switch 108 establishes a trusted management channel with the CDM system 106. In some example embodiments, the switch 108 may be a device capable of being deployed at a site with minimal manual effort. Such a device may include, without limitation, any of the lineup of Instant On™ products offered by Aruba™ (a division of Hewlett Packard Enterprise™ (HPE)). Further, the access point 118 may also be an Instant On™ product.

In example scenarios, the administrator 102 may configure the selected port 116 with the appropriate configuration settings required for the access point 118 to connect to the CDM system 106. More specifically, the administrator 102 may manually configure the port 116 via the CDM system 106 using a user device 104 that is communicatively coupled to the CDM system 106 via one or more networks (not shown). General network connectivity between two systems/devices/other entities is shown in FIGS. 1A-1E using larger double arrows. For instance, in FIG. 1A, larger double arrows are used to illustrate the general communicative coupling between the switch 108 and CDM system 106 as well as between the user 102 and the user device 104. Specific communication links and/or data transmissions are shown using smaller double or single arrows, as the case may be.

Configuration settings applied to the port 116 may include, for example, settings for configuring the port 116 to provide the access point 118 with access to all virtual local area networks (VLANs) used at the customer site, in particular, access to a management VLAN that devices on the network use to communicate with each other and with the CDM system 106. Configuring the port 116 may further include, without limitation, removing access control list (ACLS) and/or other network protections (e.g., Address Resolution Protocol (ARP) spoofing attack protections) to permit all traffic to flow through the port 116; configuring the port 116 to provide Power-On-Ethernet (PoE) functionality (if the port 116 is capable of providing such functionality) to ensure that the access point 118 stays powered on; and so forth. Once the port 116 is fully configured, the access point 118 is capable of utilizing its connection via the configured port 116 to begin offering services on the network including establishing a secure connection with the CDM system 106.

FIGS. 1B-1E schematically depict various example embodiments for network port auto-configuration and device verification processing. FIGS. 2A-2E are flowcharts that illustrate the data exchanges that occur between the access point 118, the network switch 108, and the CDM system 106 to implement the example port auto-configuration and device verification processes disclosed herein. These auto-configuration and verification processes may be executed when, for example, the access point 118 is switched to a different network port or when a new unknown device is first connected to a network port.

FIGS. 2A-2E depict various blocks representing operations performed by the access point 118, the network switch 108, and/or the CDM system 106. Each of the access point 118, the network switch 108, and the CDM system 106 may include one or more computing devices/components/systems having the illustrative configuration of computing system 300 depicted in FIG. 3. In some embodiments, the computing system 300 may represent an illustrative configuration of hardware and storage devices of the access point 118 and/or the network switch 108. In some embodiments, the CDM system 106 may include one or more servers having the illustrative configuration of the computing system 300.

Figure 2A:
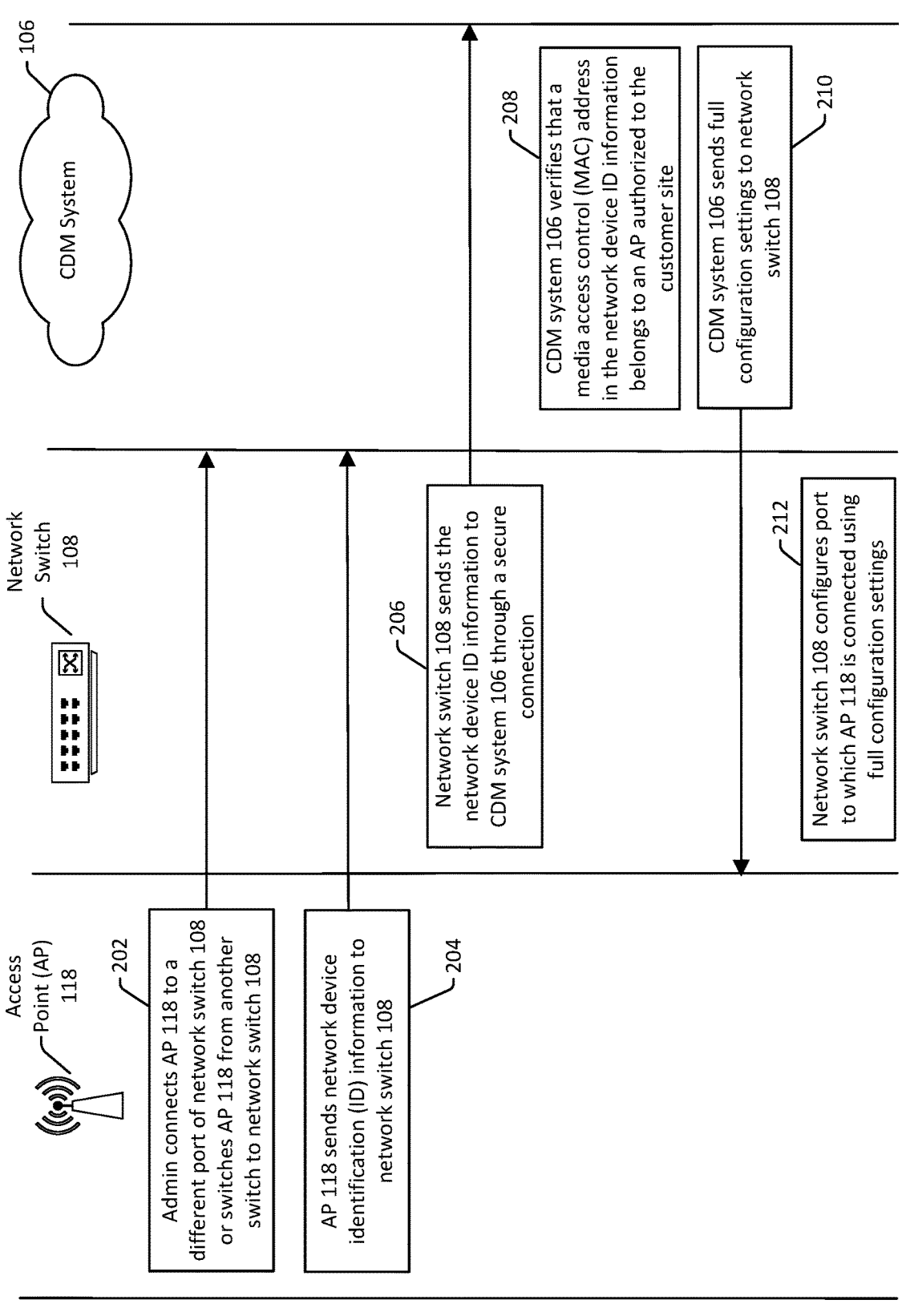
FIG. 2A is a flowchart illustrating auto-configuration of a network communication port based on verification of a MAC address of a network device connected to the port according to example embodiments of the disclosed technology.
Figure 2B:
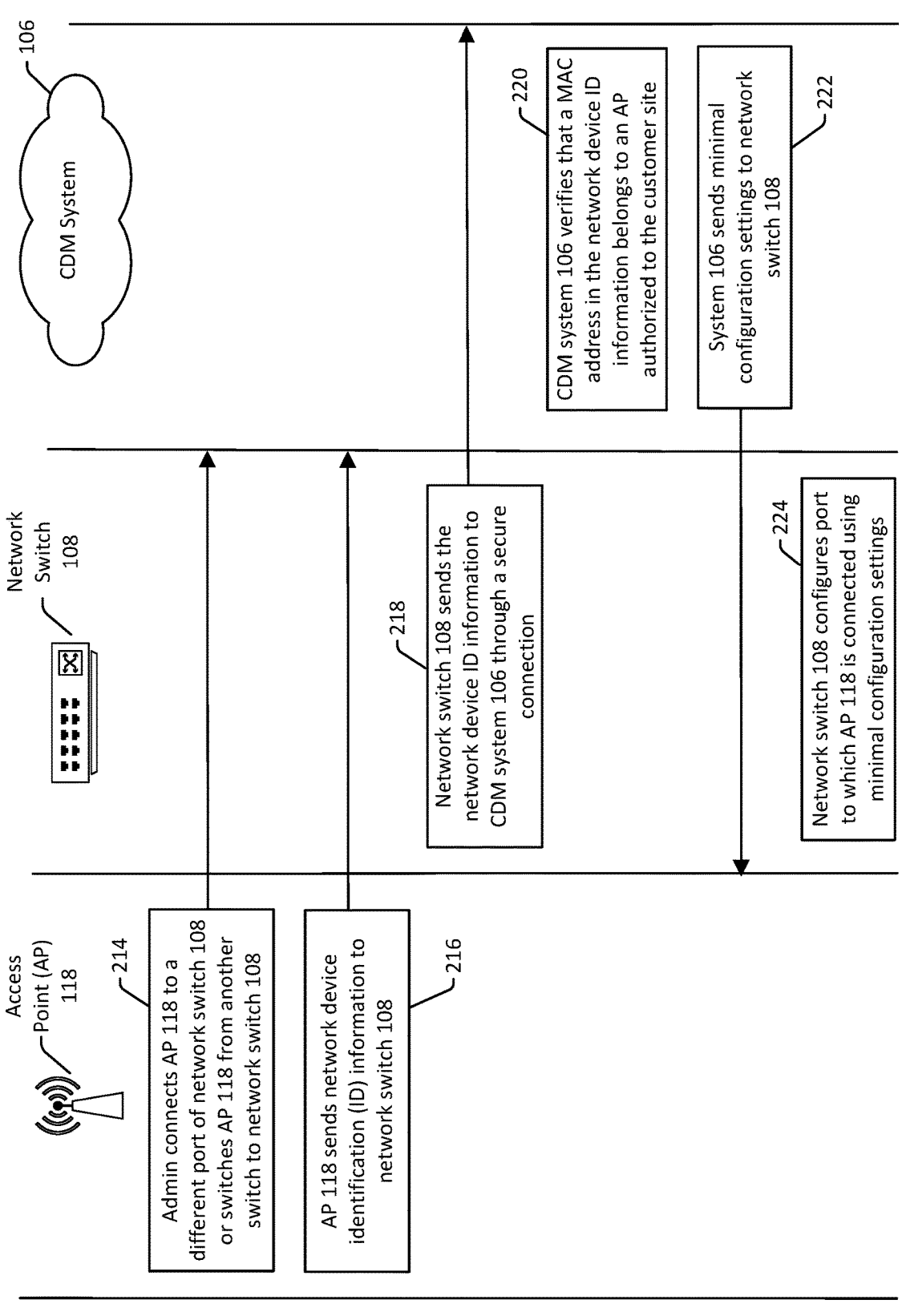
Figure 2D:
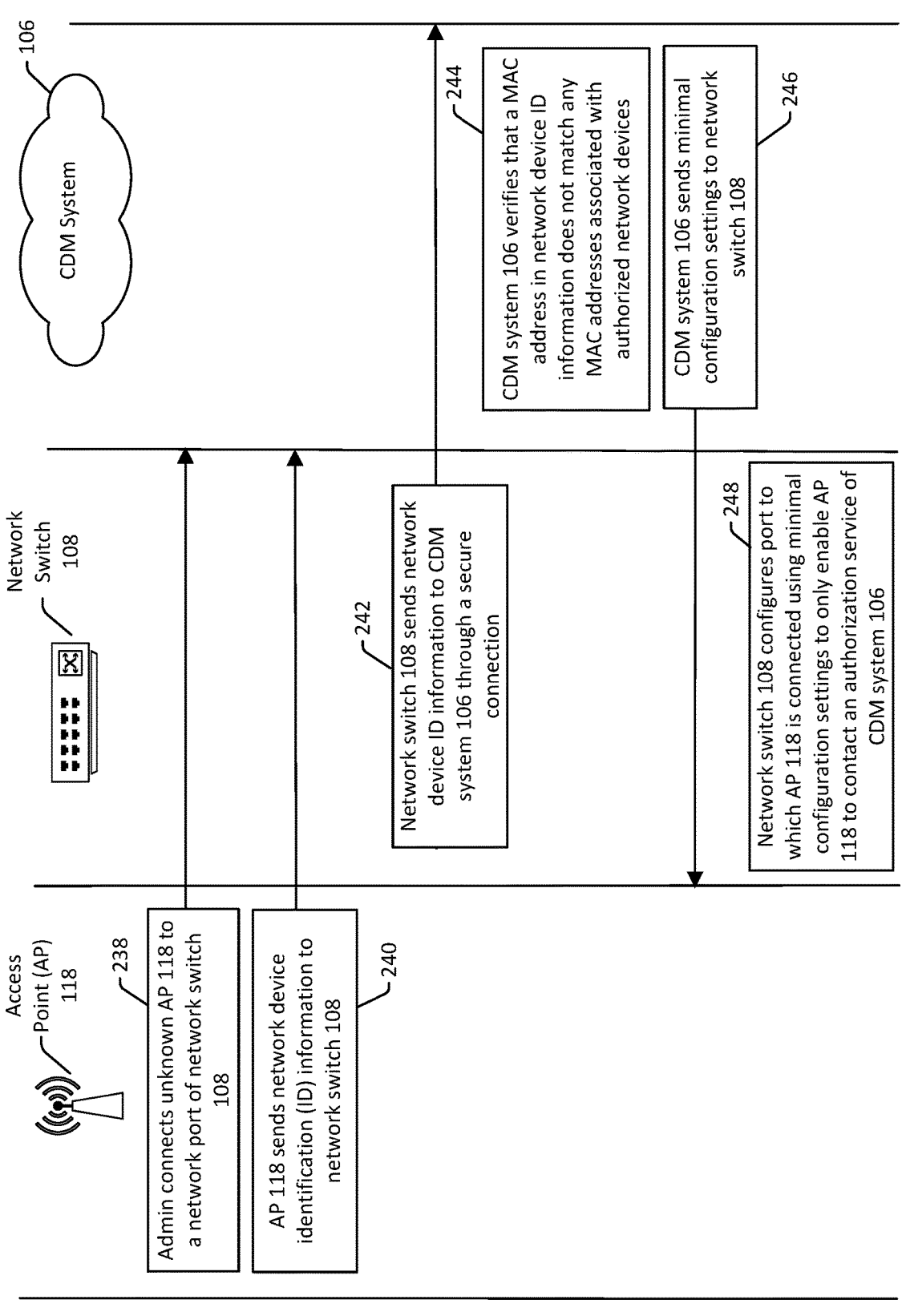
FIG. 2D is a flowchart illustrating an initial device detection stage of a process for auto-configuring a network communication port to which a previously unknown network device has been connected according to example embodiments of the disclosed technology.
Figure 2E:
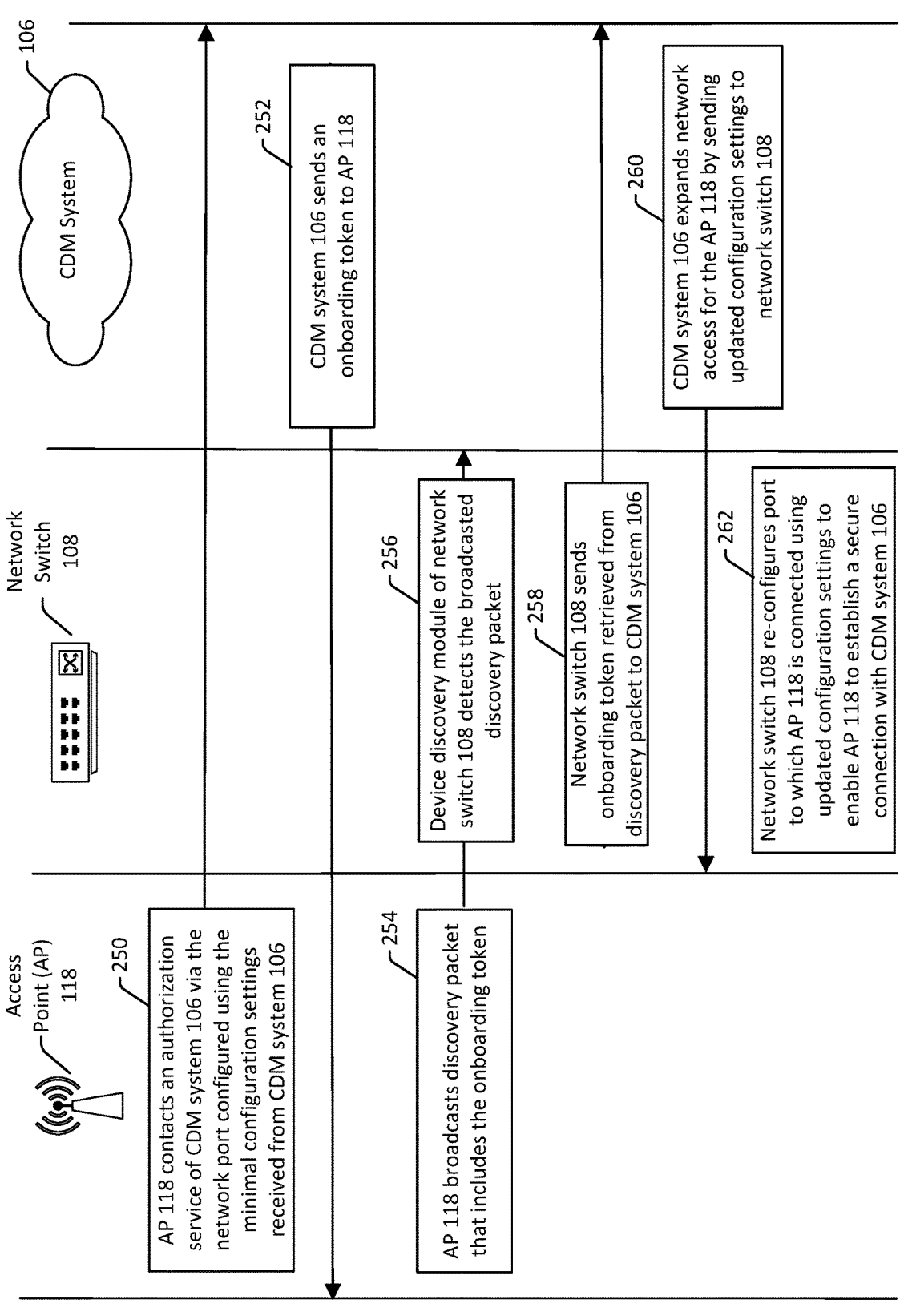
FIG. 2E is a flowchart illustrating an intermediary verification processing stage of a process for auto-configuring a network communication port to which a previously unknown network device has been connected according to example embodiments of the disclosed technology.
Figure 3:
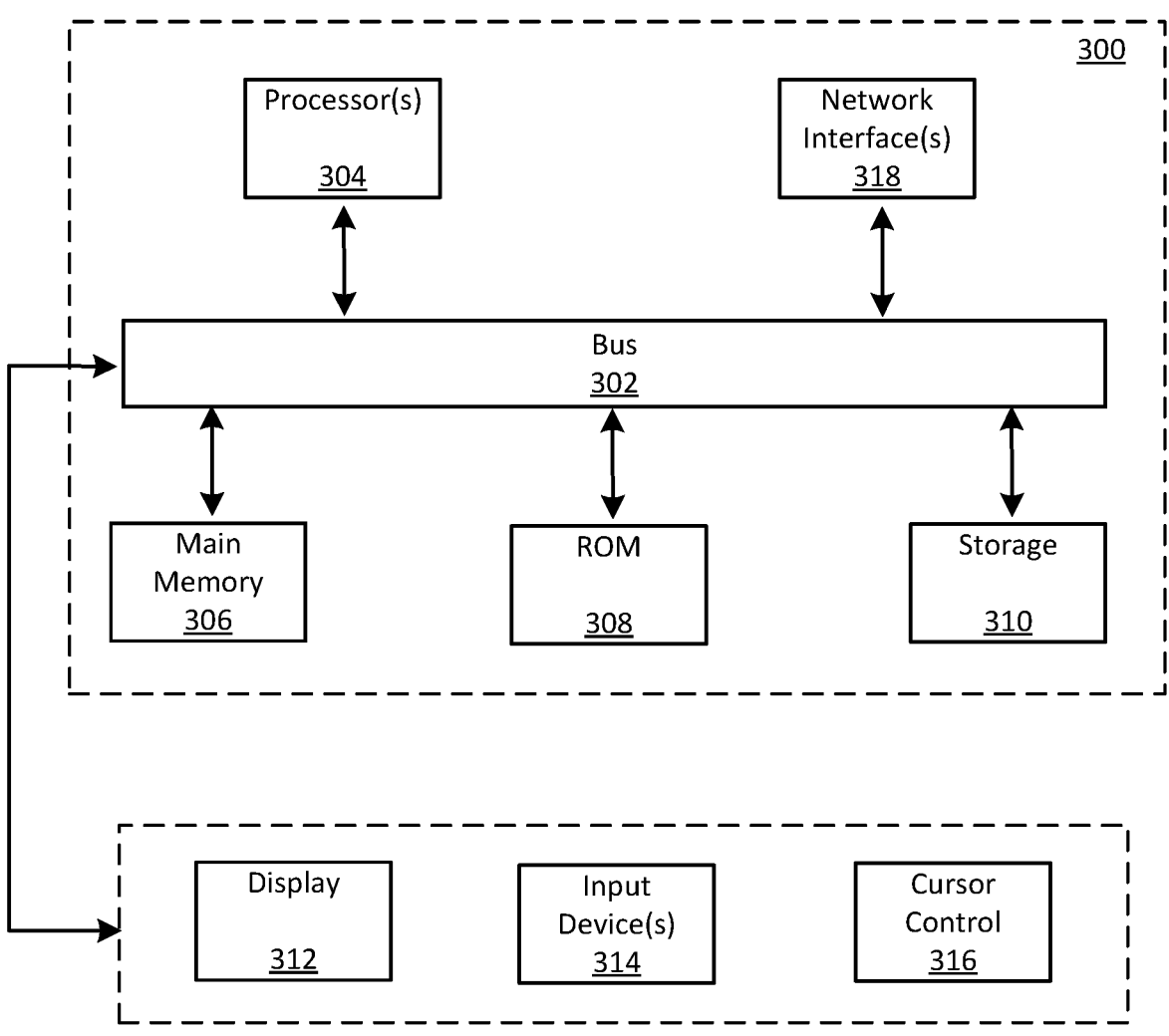
FIG. 3 is an example computing component/device/system that may be used to implement various features of example embodiments of the disclosed technology.

Each operation depicted in FIGS. 2A-2E may be performed responsive to execution by one or more processors (e.g., processor(s) 304) of one or more machine-executable instructions stored in machine-readable storage media (e.g. any of the storage media depicted in FIG. 3). The terms machine-executable and machine-readable may be used herein interchangeably at times with the terms computer-executable and computer-readable, respectively. In some example embodiments, the instructions for performing the operation(s) of one or more blocks may be modularized into one or more computing engines. Each such computing engine may include a set of machine-readable/machine-executable instructions, that when executed by one or more hardware processors (e.g., processor(s) 304), cause the hardware processors to perform corresponding tasks/processing/ operations. In example embodiments, the set of tasks performed responsive to execution of the set of instructions forming part of a particular computing engine may be a set of specialized/customized tasks for effectuating a particular type/scope of processing.

These computing engines can be implemented in any combination of hardware, software, and/or firmware. In some embodiments, one or more of these engines can be implemented, at least in part, as software and/or firmware modules that include computer-executable/machine-executable instructions that when executed by a processing circuit (e.g., the processor(s) 304) cause one or more operations to be performed. In some example embodiments, these engines may include customized computer-executable logic implemented within a customized computing machine such as a customized field programmable gate array (FPGA), an application specific integrated circuit (ASIC), a programmable logic controller (PLC), or the like.

Figure 1B:
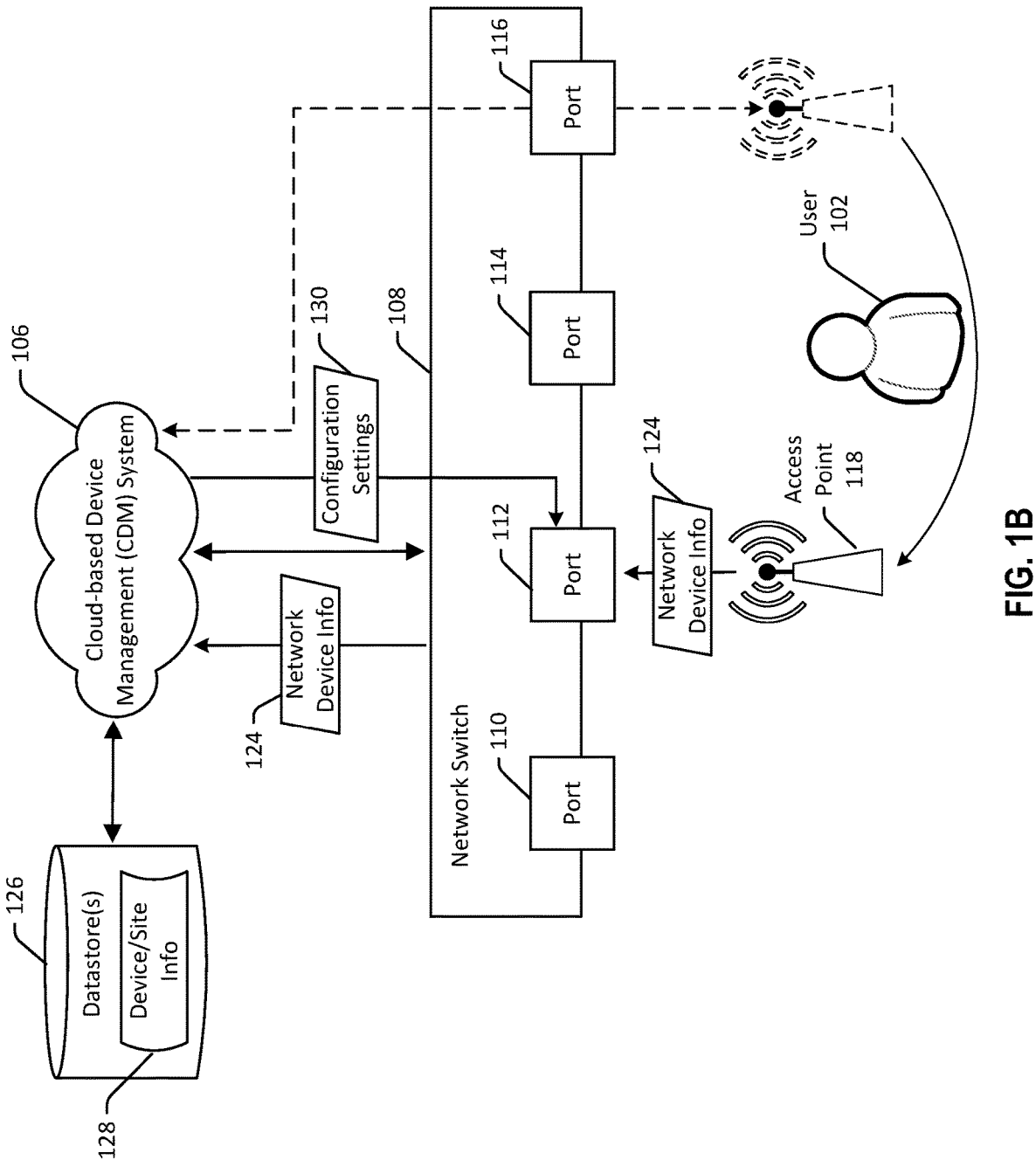
FIG. 1B is a schematic diagram illustrating auto-configuration of a network communication port based on verification of a media access control (MAC) address of a network device connected to the port according to example embodiments of the disclosed technology.

FIG. 1B is a schematic diagram illustrating a scenario according to which a known network device connected to a network port of an upstream network device may be switched to another port on the same upstream device or to a port of another upstream device. In order for the known device to function properly on the new port, the configuration settings associated with the prior port may be replicated to the new port. FIG. 1B is a schematic diagram illustrating such a scenario in which the network administrator switches the access point 118 from port 116 to another port on the switch 108 (e.g., port 112). FIG. 1B further depicts an auto-configuration process that is initiated for the port 112 after the access point 118 is switched to the port 112, which includes verifying a MAC address of the access point 118 now connected to the port 112. FIG. 2A is a flowchart illustrating the auto-configuration process schematically depicted in FIG. 1B. FIGS. 1B and 2A will be described in conjunction with one another hereinafter.

Referring now to FIGS. 1B and 2A together, at block 202, the network administrator 102 may connect the access point 118 to a different port of the network switch 108. For instance, FIG. 1B illustratively depicts the administrator 102 moving the access point 118 from the port 116 to the port 112. The prior connection of the access point to the port 116 and the secure connection established between the CDM system 106 and the access point 118 through the port 116 are depicted using dashed lines to indicate that the access point 118 was previously connected to port 116, but has now been moved to port 112. It should be appreciated that in other example embodiments, the access point 118 may be switched to a port of another network switch.

At block 204, the access point 118 sends network device identification (ID) information 124 to the network switch 108. At block 206, the network switch 108 sends the information 124 received from the access point 118 via the port 112 to the CDM system 106. The network switch 108 may send the network device ID information 124 to the CDM system 106 via an established secure connection. In example embodiments, the network device ID information 124 may be Link Layer Discovery Protocol (LLDP) information that includes, among other things, a source MAC address identifying the access point 118. LLDP information may be sent and received at the link layer of network communication, which is the lowest layer in the Internet protocol suite. The Internet protocol suite is the set of communication protocols used in the Internet and similar computer networks. It is commonly referred to as TCP/IP based on two important protocols contained in the suite—the Transmission Control Protocol (TCP) and the Internet Protocol (IP). The network device ID information 124 will be referred to hereinafter as the LLDP information 124 for ease of explanation. It should be appreciated, however, that the network device ID information 124 may include other types of network data/information that can be used to uniquely identify a network device.

The Link Layer Discovery Protocol is a vendor-neutral link layer protocol used by network devices to advertise their identity, capabilities, and neighbors on a local area network based on Institute of Electrical and Electronics Engineers (IEEE) 802 technology, in particular, wired Ethernet. LLDP information sent by a network device may take the form of an Ethernet frame that includes various information field structures within the frame. An example LLDP frame includes, among other things, a field for specifying a source MAC address (i.e., MAC address of the network device sending the LLDP frame) as well as various type-length-value (TLV) fields for specifying various other types of device information. The TLV fields may include mandatory TLVs such as chassis ID, port ID, and time-to-live (TTL). In addition, one or more optional TLV fields may be available for specifying other organization-specific, device-specific, etc. information. For example, an optional TLV field may be used to specify that the connected device is a specific type of device such as a device that is eligible to be connected to the network using network port auto-configuration processes disclosed herein or in an otherwise seamless manner that requires little to no manual effort. Such a device may include, without limitation, any of the lineup of Instant On™ products previously referenced.

At block 208, the CDM system 106 identifies the source MAC address (i.e., the MAC address of the access point

118) contained in the LLDP information 124. The CDM system 106 may then access one or more datastores 126 to retrieve device/site information 128 relevant to the customer site at which the network switch 108 and the access point 118 are deployed. The device/site information 128 may include, for example, data indicative of MAC addresses associated with devices that have previously been authorized at the site. In particular, the stored MAC address data may identify each MAC address associated with a device that has been identified to the CDM system 106 as an authorized device at the site. In some embodiments, the administrator 102 may have previously notified the CDM system 106 of MAC addresses corresponding to authorized devices.

Assuming that the access point 118 is a device known to the CDM system 106 (which is the case in this example scenario because the access point 118 was previously securely connected to the CDM system 106 via the port 116), the MAC address contained in the LLDP information 124 received from the network switch 118 may be determined to match a stored MAC address. Based on this detected match, the CDM system 106 may authenticate the access point 118 as an authorized device, and at block 210, the CDM system 106 may send configuration settings 130 to the network switch 108 to enable the switch 108, at block 212, to fully configure the port 112 and ensure full delivery of network services by the access point 118. That is, the configuration settings 130 may include one or more configuration files, items, etc. that specify the complete configuration required for the port 112 to enable full delivery of network services by the access point 118.

The port auto-configuration and device verification processes depicted and described with respect to FIGS. 1B and 2A provide enhanced network security over conventional techniques. However, the possibility remains that a malicious actor is able to spoof the MAC address of the access point 118, in which case, the verification process executed by the system CDM 106 on the spoofed MAC address would pass. As a result, the CDM system 106 may provide full configuration settings 130 to the network switch 108, enabling the switch 108 to fully configure the port 112, and thereby potentially granting the malicious actor full network access.

Figure 1C:
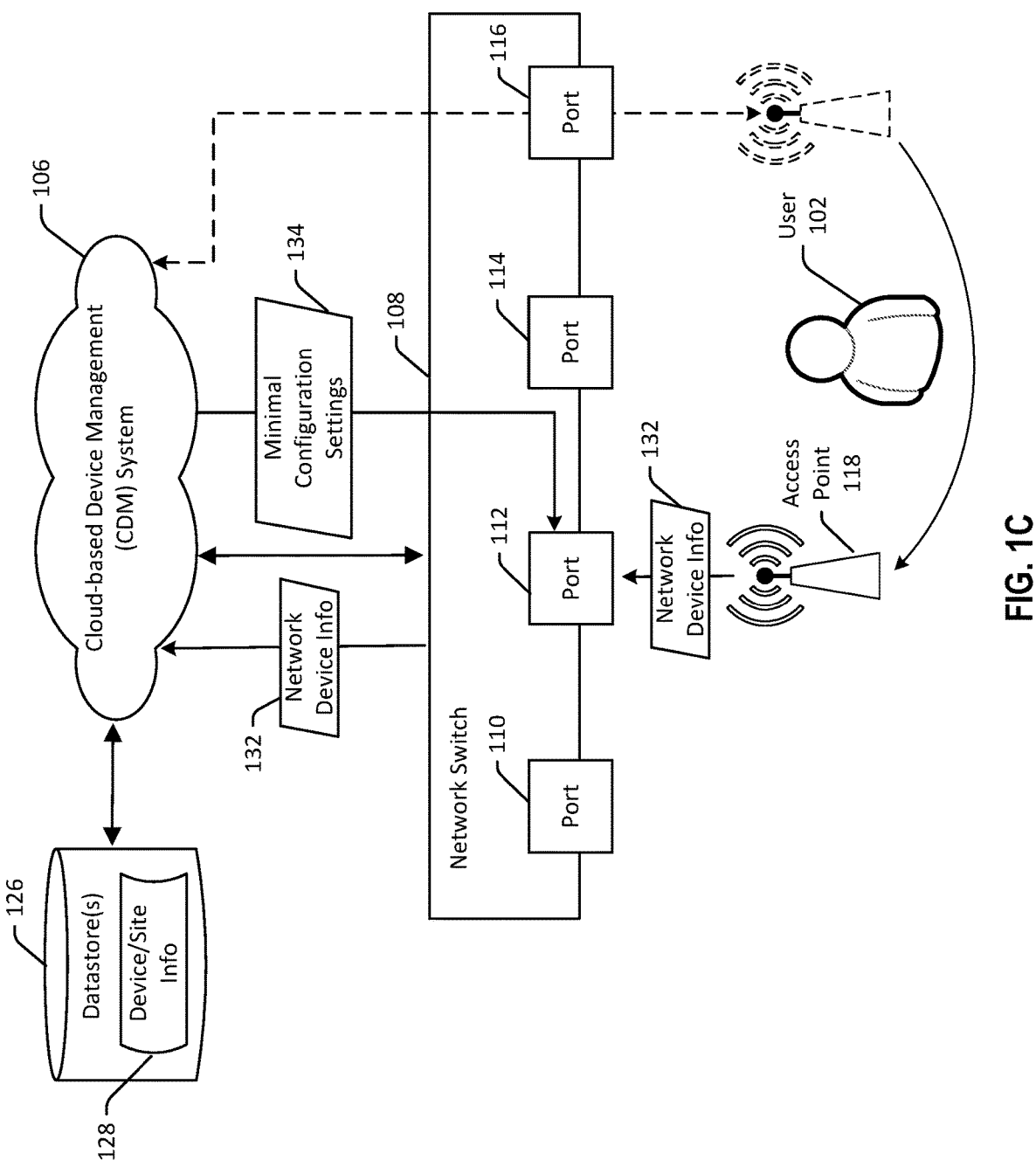
FIGS. 1C and 1D are schematic diagrams illustrating an alternative embodiment for auto-configuring a network communication port using stepped verification processing according to example embodiments of the disclosed technology.
Figure 1D:
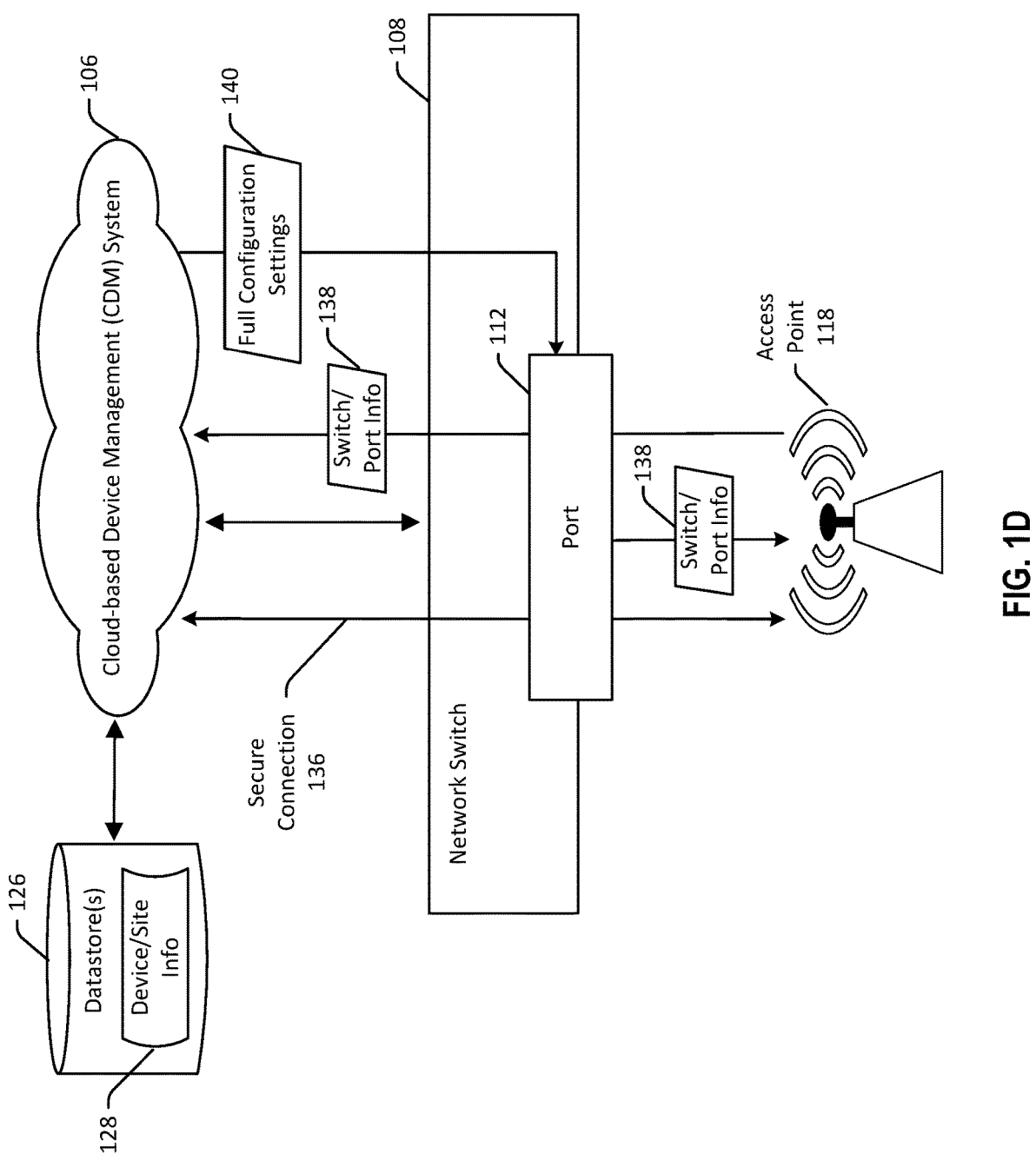

To further protect against the possibility that a malicious actor is able to spoof the MAC address of the access point 118, and thereby provide an even greater level of device authentication and security, a port auto-configuration process that involves a more rigorous stepped verification technique is schematically depicted in FIGS. 1C and 1D. FIGS. 2B and 2C are flowcharts depicting a sequence of operations performed to implement the auto-configuration process with stepped verification. FIGS. 1C and 1D will be described in conjunction with FIGS. 2B and 2C hereinafter.

Referring first to FIG. 2B in conjunction with FIG. 1C, the stepped verification process may proceed initially as described above with respect to the auto-configuration process depicted above in reference to FIGS. 1B and 2A. That is, the operations at blocks 214, 216, 218, and 220 may be substantially the same as the operations at blocks 202, 204, 206, and 208, respectively. However, in contrast to the operation at block 210, upon verifying that the MAC address contained in network device ID information 132 (e.g., LLDP information) sent by the access point 118 and received from the switch 108 via port 112 matches a stored MAC address associated with an authorized device, the CDM system 106 may, at block 222, provide the network switch 108 with only minimal configuration settings 134. Then, at block 224, the network switch 108 may use the minimal configuration settings 134 to configure the network port 112 to enable the access point 118 to establish a secure communication link/channel with the CDM system 106. The minimal configuration settings 134 may be insufficient, however, for enabling the access point 118 to engage in network communications (e.g., communicate directly with other network devices) beyond those which may be permitted via the secure communication link with the CDM system 106.

Referring now to FIG. 1D in conjunction with FIG. 2C, after the port 112 has been configured with the minimal configuration settings 134, the access point 118 may establish, at block 226, a secure communication link 136 with the CDM system 106 using secure credentials that were previously provided to the access point 118. For instance, the access point 118 may have been provided with secure credentials for connecting to the CDM system 106 after the administrator 102 authorizes the access point 118.

At block 228, the network switch 108 may send switch/port information 138 to the access point 118. The switch/port information 138 may include LLDP information that identifies the switch and the specific port (i.e., port 112) to which the access point 118 is connected. It should be appreciated that the other network ports of the network switch 108 are omitted from FIG. 1D for ease of depiction. Upon establishing the secure communication channel 136 with the CDM system 106, the access point 118 may report, to the CDM system 106, the LLDP information 138 received from the network switch 108. In some example embodiments, the network switch 108 may send the AP 118 the switch/port ID information earlier in the auto-configuration process such as upon connecting the AP 118 to the network port. However, even if received earlier, the AP 118 may not send the switch/port ID information to the CDM system 106 until the AP 118 is able to establish the secure connection with the CDM system 106.

Then, at block 232, the CDM system 106 may cross-check and compare the switch/port LLDP information 138 reported by the access point 118 via the secure communication link 136 to the access point LLDP information 132 previously reported by the switch 108 to verify that the access point 118 that reported the switch/port LLDP information 138 is connected to the same network switch port from which the access point LLDP information 132 was previously received. If the two sets of LLDP information match up, the CDM system 106 may, at block 234, send the full configuration settings/details 140 to the switch 108 to enable the switch 108, at block 236, to configure the network port to which the access point 118 is connected (i.e., port 112) for full delivery of network services.

In example embodiments, the CDM system 106 may identify/extract/retrieve a network switch identifier and/or a network port identifier from the switch/port LLDP information 138. The network switch identifier and the network port identifier may be the same identifier or different identifiers. In some example embodiments, the network switch identifier and/or the network port identifier may be MAC addresses. In example embodiments, the CDM system 106 may determine that the access point LLDP information 132 and the switch/port LLDP information 138 match if the network switch identifier identifies the network switch 108 from which the access point LLDP information 132 was received and/or the network port identifier identifies the network port 112 via which the access point LLDP information 132 was received. In some example embodiments, the CDM system 106 may determine that the switch/port LLDP information 138 matches the access point LLDP information 132 by alternatively or additional determining that a unique device identifier (e.g., a MAC address for the access point 118) included in the access point LLDP information 132 identifies the network device (e.g., access point 118) from which the switch/port LLDP information 138 was received.

It should be appreciated that this second stage of verification processing of the stepped verification process provides an extra layer of security. In particular, in some scenarios, it may be possible for a malicious actor to spoof the MAC address of the access point 118, in which case, MAC address verification alone may be insufficient to ensure network security. In such example scenarios, the second stage of the stepped verification process may serve as an additional authentication measure that must pass before full configuration of the network port is permitted. That is, by initially providing the network switch 108 with minimal configuration settings 134 that only permit the access point 118 to establish a secure connection link 136 with the CDM system 106, and subsequently performing an additional verification to ensure that the access point LLDP information 132 received from the network switch 108 matches switch/port LLDP information 138 received from the access point 118 via the secure link 136, the threat of spoofing the MAC address of the access point 118 is neutralized. In particular, even if a malicious actor spoofs the MAC address of the access point 118 and the network switch 108 configures the network port 112 based on the minimal configuration settings 134 to permit the secure connection 136 to be established with the CDM system 106, the malicious actor would not be able to establish the secure communication link 136 because it would not have access to the necessary secure credentials. As such, the second verification stage would not occur and the network port 112 would not be fully configured, thereby preventing the spoofer from gaining network access.

Example embodiments of the port auto-configuration processes disclosed herein include configuring a network port to provide different levels of network access to a network device based on the type of configuration settings used to configure the port. For instance, in some example embodiments, a network port configured based on the minimal configuration settings 134 enables network access of more limited/narrower scope than a network port configured based on the full configuration settings 140. As previously noted, network access of more limited scope may correspond to a network device only being able to establish a secure connection with the CDM system 106. In example embodiments, the configuration settings can be modified to obtain any of a multitude of possible scopes of network access. In some example embodiments, a network port can be configured based on configuration settings that provide an even more restrictive network access capability than the minimal configuration settings 134. For instance, a network port can be configured to only allow a connected network device to communicate with a specific service hosted by the CDM system 106 rather than establish an overall secure connection with the CDM system 106.

In some example embodiments, a new and previously unknown network device may be connected to a network communication port. When such a new network device unknown to the CDM system 106, but which is a device model recognized by the CDM system 106, is connected to a network communication port of a known and securely connected network device, configuration settings are applied to the network port to enable the new network device to establish a secure connection with the CDM system 106 and start offering services on the network. As previously described, an administrator at the customer site typically applies these configuration settings manually at a user terminal (e.g., user device 104) connected to the CDM system 106. In addition, the administrator 102 notifies the CDM system 106 that the new network device is an authorized device at the customer site. For instance, the administrator 102 provides the CDM system 106 with a unique identifier such as the MAC address of the new network device, which the CDM system 106 may add to a list of MAC addresses representative of authorized devices at the customer site. Certain example embodiments of the disclosed technology relate to auto-configuration processes that automate this mostly manual process typically employed for onboarding a new network device and configuring the network port to which the new device is connected. That is, in addition to network port auto-configuration techniques for known network devices that are switched from an existing connected network port to a new port, example embodiments of the disclosed technology also relate to network port auto-configuration for new unknown network devices.

Figure 1E:
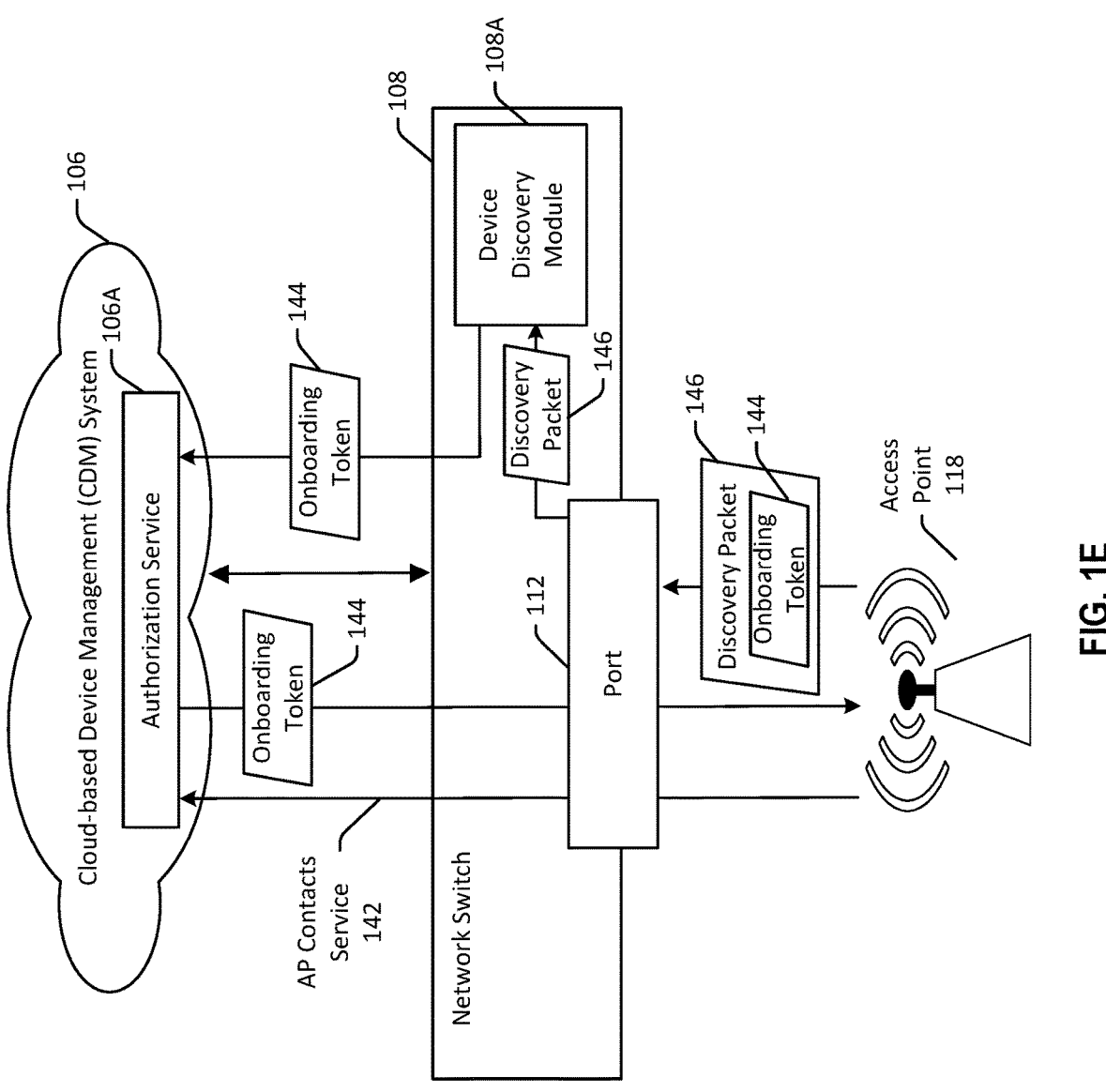
FIG. 1E is a schematic diagram illustrating a device authentication and final configuration stage of a process for auto-configuring a network communication port to which a previously unknown network device has been connected according to example embodiments of the disclosed technology.

FIG. 1E is a schematic diagram illustrating an intermediary stage of verification processing performed as part of an auto-configuration process for a new unknown network device. FIG. 2E is a flowchart illustrating operations performed to implement this intermediary stage of verification processing schematically depicted in FIG. 1E. FIG. 2D is a schematic diagram illustrating an initial device detection stage of an auto-configuration process for a new unknown network device. In particular, FIG. 2D depicts device detection operations that are performed responsive to a new unknown network device being connected to a network port of an upstream device.

Referring now to FIG. 2D, at block 238, the administrator 102 connects a new unknown device (e.g., assumed to be the access point 118 in this example scenario) to a network port (e.g., port 112) of the network switch 108. At block 240, the access point 118 sends LLDP information to the switch 108, which in turn, relays the LLDP information to the CDM system 106 at block 242. The LLDP information may include a MAC address for the access point 118. In contrast to the earlier-described auto-configuration processes for a known network device, however, the CDM system 106 may recognize the MAC address as corresponding to an unknown device rather than to a known authorized device. For instance, at block 244, the CDM system 106 may determine that the MAC address included in the received LLDP information does not match any of the stored MAC addresses associated with known authorized devices, and thus, may determine that the MAC address corresponds to an unknown device.

Based on determining that the MAC address corresponds to an unknown device but a recognized device model, the CDM system 106 may send minimal configuration settings to the network switch 108, at block 246. In contrast to the minimal configuration settings 134 sent to the network switch 108 as part of the stepped verification processing described earlier, the minimal configuration settings sent at block 246 may enable the switch 108 to configure the port 112, at block 248, in a limited manner that only permits the access point 118 to contact an authorization service of the CDM system 106.

After this initial device detection stage, the intermediary verification processing stage depicted and described in FIGS. 1E and 2E may be initiated. Referring now to FIGS. 1E and 2E in conjunction with one another, at block 250, the access point 118 contacts 142 an authorization service 106A of the CDM system 106 using the minimal configuration settings received from the CDM system 106. More specifically, the access point 118 contacts the authorization service 106A via port 112, which now has a limited configuration that was established by the switch 108 based on the minimal configuration settings received from the CDM system 106.

At block 252, the CDM system 106 may send an onboarding token 144 to the access point 118 through port 112. In some example embodiments, the onboarding token 144 may be a cryptographic key such as, for example, a public key capable of being decrypted using a private key known to the system 106. In some example embodiments, the CDM system 106 may randomly generate the onboarding token 144. Then, at block 254, the access point 118 may broadcast a discovery packet 146. The discovery packet 146 may include the onboarding token 144 previously received from the CDM system 106. In some example embodiments, the access point 118 may broadcast the discovery packet 146 via the Ethernet port 112.

At block 256, the switch 108 may detect the broadcasted discovery packet 146. In particular, a device discovery module 108A of the network switch 108 may be configured to monitor the port 112 and may detect receipt of the discovery packet 146 on the port 112. Then, at block 258, the network switch 108 may send the onboarding token 144 retrieved from the discovery packet 146 to the CDM system 106. Upon receipt of the onboarding token 144, the CDM system 106 may confirm that the received token is the same token that the authorization service 106A previously provided to the access point 118. For instance, the CDM system 106 may decrypt the onboarding token received from the network switch 108 using a private key only known to the CDM system 106, and in this way, can confirm that the token is the same token that the authorization service 106A previously sent to the access point 118. In addition, the administrator 102 may notify the CDM system 106 that the access point 118 is an authorized device at the customer site.

Upon confirming that the onboarding token 144 received from the network switch 108 is the same token previously provided to the access point 118 and receiving notification from the user 102 that the access point 118 is an authorized device, the CDM system 106 may expand the network access provided to the access point via the port 112 by updating the previously provided minimal configuration settings with more expansive settings and sending the updated configuration settings to the network switch 108 at block 260. Then, at block 262, the network switch 108 may re-configure the port 112 with the updated configuration settings to increase the network access provided to the access point 118. The updated port configuration may now allow the access point 118 to establish a secure connection with the CDM system 106 via the port 112.

At the conclusion of the intermediary stage of verification processing depicted in FIGS. 1E and 2E, the access point 118 can now establish a secure connection to the system 106 through the re-configured port 112. The final stage of the auto-configuration process for the previously unknown access point 118 includes device authentication operations similar to those performed as part of the second stage of the stepped verification processing. More specifically, referring, for example, to FIG. 2C, the access point 118 establishes a secure connection to the system 106 via the port 112 which has been re-configured to provide expanded network access to the access point 118. The network switch 108 then sends switch/port ID information (e.g., switch/port LLDP information) to the access point 118, which in turn, sends the switch/port LLDP information to the CDM system 106.

The CDM system 106 may then cross-check and compare the switch/port LLDP information reported by the access point 118 to the access point LLDP information previously reported by the switch 108 during the initial device detection stage to verify that the access point 118 that reported the switch/port LLDP information via its secured communication link with the CDM system 106 is in fact connected to the same network switch port from which the access point LLDP information was previously received. If the two sets of LLDP information match up, the CDM system 106 may send the full configuration settings/details to the switch 108 to enable the switch 108 to configure the network port 112 for full network service delivery.

FIG. 3 depicts a block diagram of an example computer system 300 in which various of the embodiments described herein may be implemented. The computer system 300 includes a bus 302 or other communication mechanism for communicating information, one or more hardware processors 304 coupled with bus 302 for processing information. Hardware processor(s) 304 may be, for example, one or more general purpose microprocessors. The processor(s) 304 may include any suitable processing unit, controller, or the like.

The computer system 300 also includes a main memory 306, such as a random access memory (RAM), cache and/or other dynamic storage devices, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

The computer system 300 further includes a read only memory (ROM) 308 or other static storage device coupled to bus 302 for storing static information and instructions for processor 304. A storage device 310, such as a magnetic disk, optical disk, or USB thumb drive (Flash drive), etc., is provided and coupled to bus 302 for storing information and instructions.

The computer system 300 may be coupled via bus 302 to a display 312, such as a liquid crystal display (LCD) (or touch screen), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. In some embodiments, the same direction information and command selections as cursor control may be implemented via receiving touches on a touch screen without a cursor.

The computing system 300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor(s) 304 executing one or more sequences of one or more instructions contained in main memory 306. Such instructions may be read into main memory 306 from another storage medium, such as storage device 310. Execution of the sequences of instructions contained in main memory 306 causes processor(s) 304 to perform the process steps described herein. In alternative embodiments, hard-wired circuitry may be used in place of or in combination with software instructions.

The term "non-transitory media," and similar terms such as machine-readable storage media, as used herein, refers to any media that store data and/or instructions that cause a machine to operate in a specific fashion. Such non-transitory media may comprise non-volatile media and/or volatile media. Non-volatile media includes, for example, optical or magnetic disks, such as storage device 310. Volatile media includes dynamic memory, such as main memory 306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 302. Transmission media can also take the form of acoustic or light waves, such as those generated during radio-wave and infra-red data communications.

The computer system 300 also includes a communication interface 318 coupled to bus 302. Network interface 318 provides a two-way data communication coupling to one or more network links that are connected to one or more local networks. For example, communication interface 318 may be an integrated services digital network (ISDN) card, cable modem, satellite modem, or a modem to provide a data communication connection to a corresponding type of telephone line. As another example, network interface 318 may be a local area network (LAN) card to provide a data communication connection to a compatible LAN (or WAN component to communicated with a WAN). Wireless links may also be implemented. In any such implementation, network interface 318 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 318, which carry the digital data to and from computer system 300, are example forms of transmission media.

The computer system 300 can send messages and receive data, including program code, through the network(s), network link and communication interface 318. In the Internet example, a server might transmit a requested code for an application program through the Internet, the ISP, the local network and the communication interface 318.

The received code may be executed by processor 304 as it is received, and/or stored in storage device 310, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 300.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method performed by a network device management system, the method comprising:

sending, from the network device management system, first configuration settings to a network switch to configure a network port of the network switch using the first configuration settings, the network port connected to a network device;

receiving, by the network device management system, an access from the network device after the network port is configured using the first configuration settings;

receiving, by the network device management system from the network device, switch/port identification information comprising an identifier of the network switch and an identifier of the network port;

performing verification processing to attempt to authenticate the network device based on the switch/port identification information; and based on the verification processing, sending, from the network device management system, second configuration settings to the network switch to configure the network port using the second configuration settings, wherein the network port configured using the first configuration settings has a more restrictive network access capability than the network port configured using the second configuration settings.

2. The method of claim 1, wherein the access from the network device comprises an establishment of a secure connection between the network device and the network device management system through the network port configured using the first configuration settings.

3. The method of claim 2, wherein the secure connection is established with a secure credential provided to the network device.

4. The method of claim 3, comprising:

receiving, by the network device management system, the secure credential from the network device through the network port configured using the first configuration settings;

authenticating, by the network device management system, the secure credential; and responsive to the authenticating, establishing, by the network device management system, the secure connection with the network device through the network port configured using the first configuration settings.

5. The method of claim 1, wherein the network switch is a first network switch, the network port is a first network port of the first network switch, and the method comprises:

receiving, from the first network switch, information of the network device responsive to a change in connection of the network device from:

a different network port of the first network switch to the first network port, or a network port of a different network switch to the first network port of the first network switch.

6. The method of claim 1, wherein the performing of the verification processing comprises:

comparing the switch/port identification information received from the network device with network device identification information previously received from the network switch; and determining that the switch/port identification information matches the network device identification information, wherein the sending of the second configuration settings to the network switch comprises sending the second configuration settings responsive to determining that the switch/port identification information matches the network device identification information.

7. The method of claim 6, wherein the configuring of the network port using the second configuration settings expands a scope of a network access for the network device from a first scope of network access provided by the configuring of the network port using the first configuration settings.

8. The method of claim 6, wherein the determining that the switch/port identification information matches the network device identification information comprises:

determining that the identifier of the network port in the switch/port identification information identifies the network port through which the network device identification information was received.

9. The method of claim 8, wherein the determining that the switch/port identification information matches the network device identification information further comprises:

determining that a network device identifier included in the network device identification information identifies the network device from which the switch/port identification information was received.

10. The method of claim 1, wherein the switch/port identification information received by the network device management system from the network device was sent to the network device by the network switch.

11. The method of claim 1, further comprising:

based on receiving the access from the network device, sending, from the network device management system, an onboarding token to the network device through the network port configured using the first configuration settings; and after the sending of the onboarding token, receiving, by the network device management system from the network switch, the onboarding token sent by the network device.

12. The method of claim 11, further comprising:

based on confirming that the onboarding token received from the network switch is the same as the onboarding token sent by the network device management system, sending, from the network device management system, third configuration settings to the network switch to configure the network port using the third configuration settings;

establishing, by the network device management system, a secure connection with the network device through the network port configured using the third configuration settings, wherein the switch/port identification information is received by the network device management system from the network device in the secure connection.

13. The method of claim 11, wherein the onboarding token received from the network switch by the network device management system was received in a discovery message by the network switch from the network device.

14. A network device management system, comprising:

a processor; and a non-transitory storage medium storing machine-executable instructions executable on the processor to:

send, from the network device management system, first configuration settings to a network switch to configure a network port of the network switch using the first configuration settings, the network port connected to a network device;

receive, at the network device management system, an access from the network device after the network port is configured using the first configuration settings;

receive, at the network device management system from the network device, network information comprising an identifier of the network switch and an identifier of the network port;

perform verification processing based on the network information; and based on the verification processing, send, from the network device management system, second configuration settings to the network switch to configure the network port using the second configuration settings, wherein the network port configured using the first configuration settings has a more restrictive network access capability than the network port configured using the second configuration settings.

15. The network device management system of claim 14, wherein the machine-executable instructions are executable on the processor to:

based on receiving the access from the network device, send, from the network device management system, an onboarding token to the network device through the network port configured using the first configuration settings; and after the sending of the onboarding token, receive, at the network device management system from the network switch, the onboarding token sent by the network device.

16. The network device management system of claim 15, wherein the machine-executable instructions are executable on the processor to:

based on confirming that the onboarding token received from the network switch is the same as the onboarding token sent by the network device management system, send, from the network device management system, third configuration settings to the network switch to configure the network port using the third configuration settings;

establish, by the network device management system, a secure connection with the network device through the network port configured using the third configuration settings, wherein the network information is received by the network device management system from the network device in the secure connection.

17. The network device management system of claim 16, wherein the onboarding token received from the network switch by the network device management system was received in a discovery message by the network switch from the network device.

18. A network switch comprising:

a plurality of network ports; and a hardware processor configured to:

detect a network device connected to a first network port of the plurality of network ports;

receive, from the network device, network device identification information including an identifier of the network device;

send the network device identification information to a network device management system;

receive, from the network device management system, first configuration settings responsive to the network device being authenticated at a first level of authentication;

configure the first network port using the first configuration settings to allow the network device to access the network device management system;

send, from the network switch to the network device, switch/port identification information comprising an identifier of the network switch and an identifier of the network port;

receive, from the network device management system, second configuration settings responsive to the network device being authenticated at a second level of authentication that is more secure than the first level of authentication, the second level of authentication being based on the switch/port identification information sent from the network device to the network device management system; and re-configure the first network port using the second configuration settings, wherein the network port configured using the first configuration settings has a more restrictive network access capability than the network port configured using the second configuration settings.

19. The network switch of claim 18, wherein the first network port configured using the first configuration settings enables partial network access for the network device, and the first network port re-configured using the second configuration settings enables complete network access for the network device.

20. The network switch of claim 18, wherein the hardware processor is further configured to determine that the network device is a known network device that was previously connected a different network port of the plurality of network ports or to a network port of another network switch.

* * * * *